Aug. 16, 1949.  K. C. CLARK  2,479,155
TIRE-WHEEL CARRIER WITH ANGULARLY
ADJUSTABLE PLATFORM
Filed Dec. 8, 1947
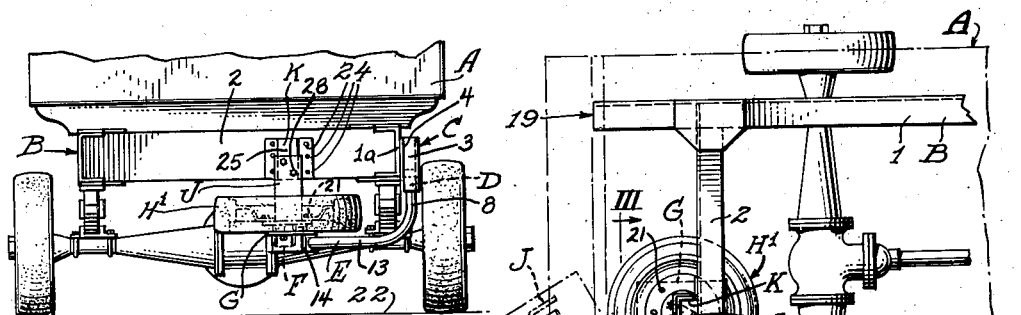
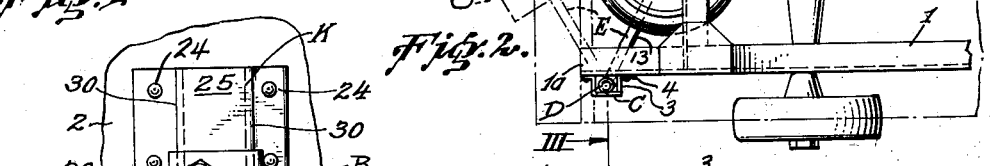
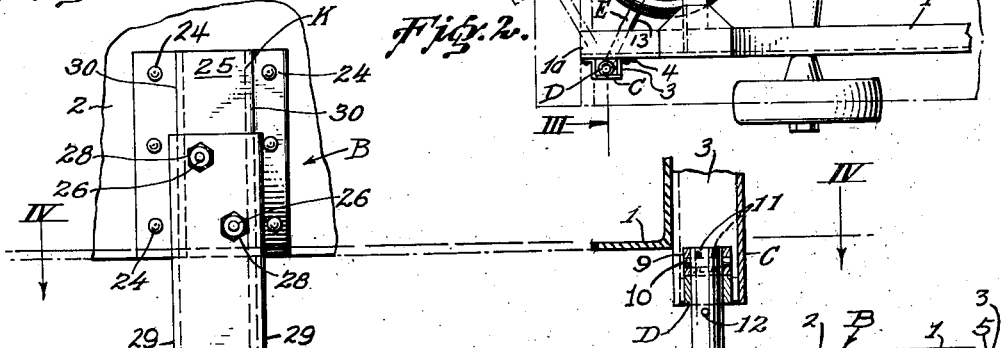
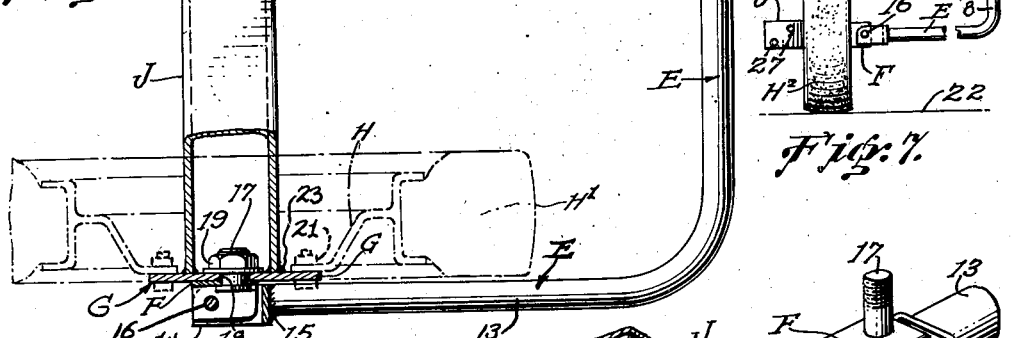
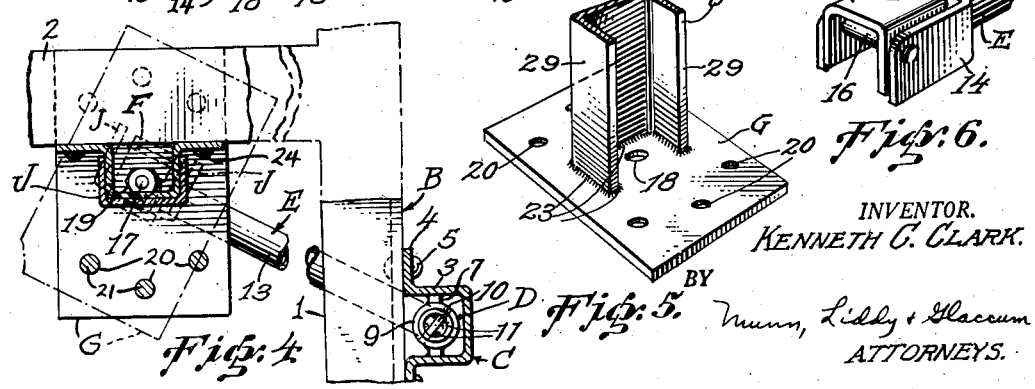
INVENTOR.
KENNETH C. CLARK.
BY
Munn, Liddy & Glaccum
ATTORNEYS.

Patented Aug. 16, 1949

2,479,155

UNITED STATES PATENT OFFICE 2,479,155

TIRE-WHEEL CARRIER WITH ANGULARLY ADJUSTABLE PLATFORM

Kenneth C. Clark, Watsonville, Calif.

Application December 8, 1947, Serial No. 790,417

7 Claims. (Cl. 224—42.22)

An object of my invention is to provide a tire-wheel carrier with angularly adjustable platform which is an improvement over the form of the invention shown in my copending application on a tire-wheel or tire rim assembly carrier, filed November 26, 1946, Serial No. 712,451. In the copending case I disclose an L-shaped swivel arm with an upright end journalled to the side of a chassis frame and horizontal end pivotally carrying a tire-wheel supporting platform. A channel-shaped arm is welded to the center of the platform and its sides straddle the sides of a channel-shaped anchorage bracket when the arm is swung into closed position. The anchorage bracket is mounted on the same side of the vehicle chassis as that which carries the journalled end of the arm.

In certain cases it is desirous to journal the L-shaped swivel arm near the rear end of the vehicle and mount the anchorage bracket on the transverse frame. Frequently the transverse frame is disposed inside the rear ends of the side chassis channels and therefore the journaling of the swivel arm will be nearer the rear end of the chassis than will be the transverse frame. Where this occurs, the sides of the channel-shaped arm carried by the platform will extend at an angle to the sides of the anchorage bracket at the completion of the swing of the arm into closed position and it will be impossible for the arm sides to straddle the sides of the channel-shaped bracket.

The principal object of my invention is to pivotally mount the platform on the horizontal end of the swivel arm so that the platform can be swung with respect to the arm, about a vertical axis to align the sides of the arm supported by the platform with the sides of the anchorage bracket and permit the platform arm to straddle the bracket. When the platform supports a tire and wheel, the operator can readily rotate the platform into the desired position by merely rotating the tire through an angle that will align the platform arm sides with the bracket sides and permit the nesting of the latter in the former.

A further object of mny invention is to provide a device of the type described which is simple in construction and durable and efficient for the purpose intended.

Other objects and advantages will appear in the following specification, and the novel features of the device will be particularly pointed out in the appended claims.

My invention is illustrated in the accompanying drawing forming a part of this application, in which:

Figure 1 is a rear elevation of a vehicle showing my device operatively applied thereto;

Figure 2 is a top plan view of the vehicle chassis showing my device connected thereto;

Figure 3 is an enlarged sectional view taken along the line III—III of Figure 2;

Figure 4 is a horizontal section taken along the line IV—IV of Figure 3;

Figure 5 is a perspective view of the wheel-carrying platform and platform-swinging arm;

Figure 6 is a perspective view of the end of the swivel arm and shows the pivoted U-shaped bracket for supporting the platform; and Figure 7 is a rear elevation of a portion of Figure 1 and illustrates the tire and wheel in ground contacting position.

While I have shown only the preferred form of my invention, it should be understood that various changes or modifications may be made within the scope of the appended claims without departing from the spirit and scope of the invention.

In carrying out my invention, I make use of a vehicle indicated generally at A and the vehicle has a chassis indicated at B, the chassis being provided with two side channels 1 and a transversely extending rear channel 2 which is spaced from the rear ends 1a of the side channels 1.

My device comprises a channel-shaped bracket C that has its sides 3 provided with feet 4 which are secured to the right-hand side channel 1 when looking at Figure 1, by rivets 5 or other suitable fastening means, see also enlarged Figure 4. The bracket C extends below the bottom of the right-hand channel 1 as illustrated in Figure 3 and at the lower end of the bracket I mount a tubular bearing D. Figure 4 shows the bearing connected to the interior of the channel C by lugs 7 and these lugs are integral with the outer surface of the bearing and are welded to the inner surface of the sides 3.

Within the bearing D, I rotatably mount a swivel arm indicated generally at E. The arm is tubular in cross section and has an upright end 8 that is rotatably received in the tubular bearing D and this same end projects above the top of the bearing so as to receive a collar 9. The collar is connected to the end 8 by means of a pin 10 that extends diametrically through the collar and through the end 8, as shown in Figure 4. Cotter pins 11 may be extended through transverse openings in the pin 10 to prevent the pin from becoming dislodged. The collar 9 rides on the top of the bearing D and supports the swivel arm. Figure 3 shows another pin 12 extending through the end 8 and placed under the bearing D so as to hold the arm from any upward movement.

The swivel arm is L-shaped and its horizontal end 13 has a clevis 14 rigidly secured thereto by welding 15, see Figure 3. The clevis 14 carries a horizontally disposed pivot pin 16 and the latter pivotally carries a U-shaped bracket F. Both Figures 3 and 6 show the bracket F provided with a bolt 17 that projects through a central opening 18 provided in a tiltable platform G, see also Figure 5. A nut 19 secures the platform G to the bracket F. It will be seen from Figure 3 that the center of the platform G is spaced slightly to the right of the pivot bolt 16 when the platform is in tire and wheel supporting position.

In my copending application above referred to, I show novel means for supporting either a disc wheel and tire or a tire and rim. The platform G can be similarly constructed so as to support either the disc wheel or tire and rim. In Figure 5, I indicate the platform as having a plurality of openings 20 arranged in a circle for receiving bolts 21, see Figure 1, that are used for connecting the disc wheel H and tire H1 to the platform. It is possible to rotate the wheel H and platform G as a unit about the bolt 17 as a pivot for a purpose now to be described. Of course, the platform and wheel can swing about the horizontally disposed pivot pin 16 in order to swing the tire H1 into contact with the ground 22, see Figure 7.

I provide a platform swinging arm and wheel guide J which is channel-shaped in cross section and has its lower end welded at 23 to the upper surface of the platform G, see Figure 5. The channel-shaped arm J is designed to straddle a channel-shaped anchor bracket K when the swivel arm E is in closed position. The anchor bracket is secured to the transverse channel 2 by rivets 24 or other suitable fastening means.

Figure 3 shows the bracket K having its web portion 25 provided with a pair of outwardly extending studs 26. These studs are received in openings 27 (see Figure 7) provided in the arm J and then nuts 28 are threaded on the studs for securing the arm to the bracket.

From the foregoing description of the various parts of the device, the operation thereof may be readily understood.

When mounting a tire and wheel on the carrier, the swivel arm E is first swung into open position and then the arm J is swung into a substantially horizontal position, the latter swinging movement taking place about the pivot pin 16, see Figure 7. The wheel and tire are now passed over the arm J and the wheel is connected to the platform G which is in a substantially vertical position, by the bolts 21 or other suitable fastening means. The swivel arm E may take the position shown in Figure 7 when securing the wheel in place, or the arm E may be swung into a position where its horizontal end 13 will extend in the same direction as the length of the side channel 1 to which it is attached.

The platform G is pivotally secured to the bracket F by the bolt 17 and the bolt is mounted to one side of the pivot pin 16 so as to make the top of the tire and wheel slightly heavier than the lower portion. The operator can, therefore, easily swing the arm J for causing the platform G to move from a substantially vertical position into a horizontal position as shown in Figure 3.

The arm E is now swung about its vertical axis for moving the platform arm J toward the anchorage bracket K. This movement is indicated in Figure 2 and in Figure 4 I illustrate by the dot-dash lines the relative position of the platform and the arm J with respect to the anchorage bracket K when the platform is not swung about the bolt 17. This dot-dash line position clearly shows how the sides 29 of the arm J cannot straddle the sides 30 of the bracket K unless the arm is swung about its longitudinal axis. It is necessary to swing the platform and the arm J about the vertical axis of the bolt 17 to align the arm J with the bracket K. This swinging movement can be accomplished by the operator rotating the wheel and tire. By this simple arrangement the arm J can be moved onto the bracket K and the studs 26 will enter the openings 27. The two parts are secured together by the nuts 28.

When removing the tire wheel from the carrier, the reverse operation is carried out from that just explained. Although Figure 7 shows the tire H1 extending vertically with respect to the ground 22, it is possible to have the platform G inclined slightly from the vertical when the tire touches the ground for aiding in connecting the tire and wheel to the platform.

I claim:

1. In a tire carrier; a swivel bracket; means for securing this bracket to a chassis frame in an upright position; a substantially L-shaped swivel arm having one end thereof rotatably supported in the swivel bracket and its free end arranged for swinging in a substantially horizontal plane; a platform supporting member arranged at the free end of the swivel arm for swinging about a horizontal axis; a platform carried by the member and being swingable therewith from a substantially vertical position into a horizontal position; connecting means between the platform and member for permitting the platform to be rotated about a vertical axis when the platform is in a horizontal position; the platform being adapted to support a tire-wheel assembly; a channel-shaped arm extending from the platform passing through the tire-wheel assembly; an anchorage bracket also secured to the chassis frame and including a channel-shaped cross-sectional portion; the anchorage bracket being mounted within the radius of swing of the free end of the swivel arm; the flanges and web of the channel-shaped arm being movable into a position to embrace and contact the channel-shaped anchorage bracket; the plate being rotatable to align the arm flanges with the anchorage bracket sides.

2. In a tire carrier; a swivel bracket; means for securing this bracket to a chassis frame in an upright position; a substantially L-shaped swivel arm having one end thereof rotatably supported in the swivel bracket and its free end arranged for swinging in a substantially horizontal plane; a platform supporting member arranged at the free end of the swivel arm for swinging about a horizontal axis; a platform carried by the member and being swingable therewith from a substantially vertical position into a horizontal position; connecting means between the platform and member for permitting the platform to be rotated about a vertical axis when the platform is in a horizontal position; the platform being adapted to support a tire-wheel assembly; a channel-shaped arm extending from the platform passing through the tire-wheel assembly;

an anchorage bracket also secured to the chassis frame and including a channel-shaped cross-sectional portion; the anchorage bracket being mounted within the radius of swing of the free end of the swivel arm; the flanges and web of the channel-shaped arm being movable into a position to embrace and contact the channel-shaped anchorage bracket; the plate being rotatable to align the arm flanges with the anchorage bracket sides; studs fixed to the anchorage bracket to extend therefrom; said channel shaped arm having openings for receiving the studs when the channel shaped arm contacts the anchorage bracket; and nuts threaded onto the stud portions projecting beyond the channel shaped arm.

3. In a tire carrier; a swivel bracket; means for securing the bracket to a chassis frame; a swivel arm having one end rotatably supported in the swivel bracket and its free end swingable into a position within the area defined by the chassis frame; an anchorage bracket carried by the chassis frame; the anchorage bracket being mounted within the radius of swing of the free end of the swivel arm; a tire-wheel assembly supporting platform carried by the swivel arm and being rotatable about a vertical axis; an arm connected to the platform and having a face adapted to contact with a surface of the anchorage bracket; the platform being rotatable for the purpose of bringing the face portion of the platform arm into complete contact with the adjacent surface of the anchorage bracket; and means for connecting the platform arm to the anchorage bracket.

4. In a tire carrier; a swivel bracket; means for securing the bracket to a chassis frame; a swivel arm having one end rotatably supported in the swivel bracket and its free end swingable into a position within the area defined by the chassis frame; an anchorage bracket carried by the chassis frame and being channel-shaped in cross section; the anchorage bracket being mounted within the radius of swing of the free end of the swivel arm; a tire-wheel assembly supporting platform carried by the swivel arm and being rotatable about a vertical axis; a channel-shaped arm connected to the platform and adapted to receive the channel portion of the anchorage bracket when the platform-carrying arm is swung into closed position; the platform being rotatable for aligning the channel arm with the sides of the channel-shaped anchorage bracket; and means for connecting the channel arm to the anchorage bracket.

5. In combination; a swivel arm having one end rotatably connected to one side of a chassis frame and near the end thereof; the swivel arm having a free end; a channel-shaped anchorage bracket secured to a transverse frame member of the chassis that is spaced in from the end; the anchorage bracket being mounted within the radius of swing of the free end of the swivel arm; a tire and wheel supporting platform rotatably carried by the free end of the swivel arm; a channel-shaped arm carried by the platform and being swingable by the swivel arm into contact with the anchorage bracket; the platform being rotatable for aligning the channel-shaped arm with the anchorage bracket so that the channel-shaped portion of the latter will nest within the channel arm; and means for securing the channel arm to the anchorage bracket.

6. In combination; a swingably mounted swivel arm having a clevis on its free end; a U-shaped bracket pivotally carried by the clevis and having a support spaced to one side of the pivotal connection between the bracket and the clevis; a platform rotatably carried by the support; a channel-shaped arm carried by the platform; a channel-shaped anchorage bracket mounted within the radius of swing of the free end of the swivel arm and adapted to be received in the channel-shaped arm; and means for removably connecting the channel-shaped arm to the anchorage bracket.

7. The combination with a chassis frame having a side member and a transverse member spaced in from the end of the side member; of a swivel bracket secured to the side chassis frame member near the end thereof; an anchorage channel-shaped bracket secured to the transverse member; an L-shaped arm rotatably supported at one end in the swivel bracket, the other end being free and swingable toward the anchorage bracket; the anchorage bracket being mounted within the radius of swing of the free end of the swivel arm; a U-shaped bracket pivotally connected to the free end of the L-shaped arm and being swingable about a horizontal axis; a tire and wheel supporting platform rotatably carried by the U-shaped bracket and being rotatable about a vertical axis when the platform is in a horizontal position; a channel-shaped arm secured to the platform and extending vertically when the platform is horizontally disposed; the channel arm being adapted to receive the channel portion of the anchorage bracket when the swivel arm swings the platform toward the anchorage bracket; the platform being rotatable on the swivel arm for aligning the channel arm with the channel portion of the anchorage bracket; and means for securing the channel arm to the anchorage bracket.

KENNETH C. CLARK.

REFERENCES CITED

The following references are of record in the file of this patent:

FOREIGN PATENTS

| Number | Country | Date |
| --- | --- | --- |
| 353,223 | Great Britain | July 23, 1931 |